UNITED STATES PATENT OFFICE.

NATHAN C. RUSSELL, OF GLOVERSVILLE, NEW YORK.

IMPROVED PROCESS OF TREATING LEATHER SO AS TO RENDER IT SUITABLE FOR THE MANUFACTURE OF GLOVES, &c.

Specification forming part of Letters Patent No. 93,910, dated August 17, 1869.

*To all whom it may concern:*

Be it known that I, NATHAN C. RUSSELL, of Gloversville, in the county of Fulton and State of New York, have invented a new and useful Improvement in the Preparation of Leather; and I do hereby declare that the following is a full, clear, and exact description of the same.

My invention consists in a novel treatment of what is known as "bark-tanned lamb or sheep skin," an article used by bookbinders, and which, while sufficiently soft and supple for the purposes of their trade, is too harsh and stiff for glove-making and a variety of other purposes. This objection is removed by my treatment of the article, and the latter rendered so soft and free, yet full, in respect of body, as to adapt it, among other purposes or uses, to the making of what are termed "dog-skin" gloves.

The process I adopt, and which constitutes my invention, is as follows: I take of "fat liquor," obtained in scouring deer-skin after tanning in oil, say, ten gallons, (10 gals.,) and warm the same by heating it to or near the boiling-point. I then add to such heated fat liquor eight ounces (8 oz.) of sal-soda, twelve ounces (12 oz.) of common salt, one pint (1 pt.) of soft soap, and four ounces (4 oz.) of Venetian red, and stir and mix these several ingredients with the fat liquor.

This forms the treating mixture or compound, and when made in the foregoing quantity will suffice for five or six dozen skins; but of course such quantity may be more or less varied, as may also the proportions of the ingredients, and the Venetian red or other coloring-matter be modified or omitted, as desired.

To effect the treatment hereinbefore referred to of the bark-tanned or bark-tanned shaved lamb or sheep skin, I lay said skin on a table or other suitable surface, and rub the above-described compound onto both sides of it, using for the purpose a horse or other suitable brush or rubber, by which it can be worked into the skin, that is afterward hung out to dry, and subsequently "staked," when the character of the skin will be found entirely changed from harshness to softness, and, in other respects, thereby adapting it to the manufacture of gloves of the description previously named and to a variety of other purposes for which said skin was not suitable prior to the treatment of it I have herein described.

Claim.

What is here claimed, and desired to be secured by Letters Patent, is—

The process, substantially as herein described, of treating bark-tanned lamb or sheep skin, by means of a compound composed and applied essentially as specified.

N. C. RUSSELL.

Witnesses:
FRED. HAYNES,
M. J. SHANLYS.